(12) United States Patent
Theurer et al.

(10) Patent No.: US 7,470,871 B2
(45) Date of Patent: *Dec. 30, 2008

(54) MACHINE FOR WELDING RAILS OF A TRACK

(75) Inventors: Josef Theurer, Vienna (AT); Bernhard Lichtberger, Linz (AT)

(73) Assignee: Franz Plasser Bahnbaumaschinen Industriegesellschaft m.b.H, Vienna (AT)

( * ) Notice: Subject to any disclaimer, the term of this patent is extended or adjusted under 35 U.S.C. 154(b) by 220 days.

This patent is subject to a terminal disclaimer.

(21) Appl. No.: 11/450,124

(22) Filed: Jun. 9, 2006

(65) Prior Publication Data

US 2006/0288899 A1   Dec. 28, 2006

(30) Foreign Application Priority Data

Jun. 24, 2005   (EP)   ................................. 05105649

(51) Int. Cl.
*H05B 1/00*   (2006.01)
*E01B 29/05*   (2006.01)

(52) U.S. Cl. .......................................... 219/53; 104/2
(58) Field of Classification Search ................ 104/2, 104/3, 5, 6, 9, 15; 219/53
See application file for complete search history.

(56) References Cited

U.S. PATENT DOCUMENTS

| | | | |
|---|---|---|---|
| 4,221,169 A * | 9/1980 | Theurer | 104/12 |
| 4,236,453 A * | 12/1980 | Collen | 104/15 |
| 4,272,664 A * | 6/1981 | Theurer | 219/53 |
| 4,929,816 A * | 5/1990 | Theurer et al. | 219/53 |
| 4,983,801 A * | 1/1991 | Theurer et al. | 219/54 |
| 5,136,140 A * | 8/1992 | Theurer et al. | 219/161 |
| 5,222,435 A * | 6/1993 | Theurer et al. | 104/2 |
| 5,222,653 A * | 6/1993 | Joyce et al. | 228/173.6 |
| 5,469,791 A * | 11/1995 | Theurer et al. | 104/5 |
| 5,511,484 A * | 4/1996 | Theurer et al. | 104/2 |
| 5,992,329 A * | 11/1999 | Scheuchzer et al. | 104/15 |
| 6,515,249 B1 * | 2/2003 | Valley et al. | 219/55 |
| 6,637,727 B1 * | 10/2003 | Decker et al. | 254/228 |
| 6,762,390 B2 * | 7/2004 | Theurer et al. | 219/53 |
| 6,852,940 B1 * | 2/2005 | Muhlleitner | 219/55 |
| 2006/0219123 A1 * | 10/2006 | Theurer | 104/2 |
| 2006/0261044 A1 * | 11/2006 | Theurer et al. | 219/53 |
| 2006/0288899 A1 * | 12/2006 | Theurer et al. | 104/2 |

FOREIGN PATENT DOCUMENTS

EP   0 326 794 B1   8/1992

* cited by examiner

*Primary Examiner*—Mark T Le
*Assistant Examiner*—Jason C Smith
(74) *Attorney, Agent, or Firm*—Laurence A. Greenberg; Werner H. Stemer; Ralph E. Locher

(57) ABSTRACT

A machine for welding rails of a track extending in a longitudinal direction includes a rail pulling device for gripping the rails to be welded to one another. The rail pulling device is connected to a machine frame of the welding machine by way of guides and coupling devices. The rail pulling device is designed for displacement in the longitudinal direction or transversely to the longitudinal direction by means of longitudinal displacement drives and transverse displacement drives, and is also vertically adjustable by means of drives. By means of tilting drives, the rail pulling device can additionally be pivoted about an axis extending in the longitudinal direction.

4 Claims, 3 Drawing Sheets

MACHINE FOR WELDING RAILS OF A TRACK

CROSS-REFERENCE TO RELATED APPLICATION

This application claims the priority, under 35 U.S.C. § 119, of European patent application 05105649.7, filed Jun. 24, 2005, which is herewith incorporated by reference in its entirety.

BACKGROUND OF THE INVENTION

1. Field of the Invention

The present invention relates, in general, to a machine for welding rails of a track, including a machine frame mobile on the track, a rail pulling device comprising clamping members and hydraulic drives, and a welding unit.

2. Description of the Related Art

Machines of this type for welding rails of a track have become known, for example, from U.S. Pat. No. 5,136,140, European patent publication 0 326 794, or from U.S. Pat. No. 4,929,816. The welding operation is assisted by a rail pulling device which pulls the clamped rail ends towards one another with great force to a distance required for the welding process. Said rail pulling device is suspended in pendulum-like fashion from a machine frame and is vertically adjustable for being lowered onto the rails in the course of working operations.

SUMMARY OF THE INVENTION

It is accordingly an object of the present invention to provide a machine of the specified kind for welding rails of a track which overcomes the disadvantages of the heretofore-known machines of this general type and which enables the rail pulling device to be positioned quickly and with precision.

With the foregoing and other objects in view there is provided, in accordance with the present invention, a machine for welding rails of a track extending in a longitudinal direction. The novel machine comprises:

a machine frame extending in the longitudinal direction and having on-track undercarriages for mobility on the track;

a rail pulling device for gripping the rails to be welded to one another, the rail pulling device having two transverse beams extending perpendicularly to the longitudinal direction;

clamping members mounted on the transverse beams for pivoting about pivot axes extending parallel to one another, the clamping members forming two respective pairs, spaced from one another in the longitudinal direction, and having clamping jaws provided for application to the rail;

hydraulic drives connecting the two pairs of clamping members to one another;

a drive connecting the rail pulling device for vertical adjustment to the machine frame;

coupling devices connecting the rail pulling device to the machine frame in the region of each of the transverse beams, respectively; longitudinal displacement drives and transverse displacement drives for displacing each coupling device in the longitudinal direction and transversely to the longitudinal direction relative to the machine frame;

a tilting drive provided on the coupling device for tilting the rail pulling device about an axis extending in the longitudinal direction; and a welding unit for welding the rails.

In accordance with an added feature of the invention, the machine further comprises a guiding carriage connected to the coupling device and mounted for displacement transversely to the longitudinal direction relative to the machine frame, with at least one of the longitudinal displacement drives and transverse displacement drives and the drive for vertical adjustment of the rail pulling device being arranged on the guiding carriage.

In accordance with a further feature of the invention, the coupling device also comprises two girders spaced from one another transversely to the longitudinal direction, with articulation points being arranged at the ends of the girders.

In accordance with an additional feature of the invention, the tilting drive is configured as a rotary drive.

With a rail pulling device which is forcibly guided in this manner, the position of said device can be precisely adjusted independently of the machine frame. As a result, in a track curve, the rail pulling device can be positioned parallel to the transversely inclined position of the track, and the subsequent centering of the rail ends to be welded together can thus be significantly improved. Furthermore, the forced guiding of the rail pulling device—which, according to the prior art, is suspended in a pendulum-like manner—prevents the same from automatically assuming a vertical position in a track curve due to the transverse inclination of the track.

Other features which are considered as characteristic for the present invention will become apparent from the appended claims.

Although the invention is illustrated and described herein as embodied in a machine for welding rails of a track, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DETAILED DESCRIPTION OF THE PREFERRED EMBODIMENT

Figure 1:
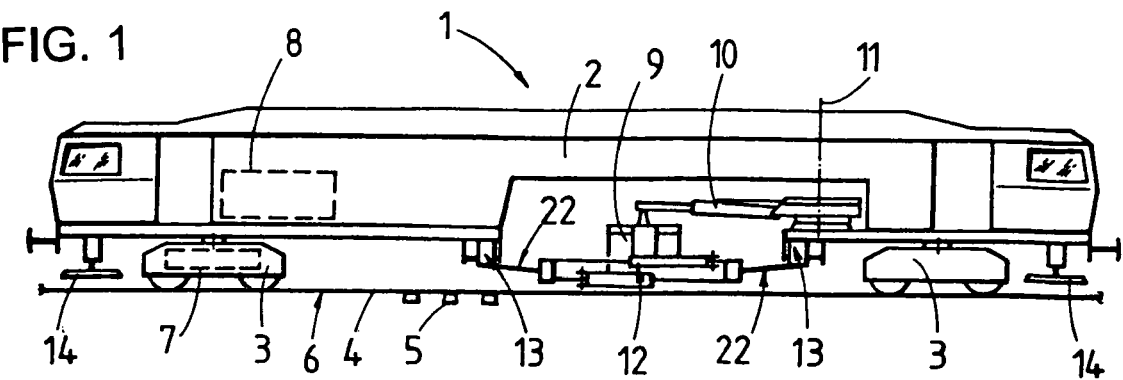
FIG. 1 is a side view of a machine for welding rails of a track, including a rail pulling device.

Turning now to the drawing in detail and first, particularly, to FIG. 1 thereof, there is shown a welding machine 1 which has a bridge-like machine frame 2. With the aid of on-track undercarriages 3, arranged at the ends, and a motive drive 7, the machine 1 is mobile on a track 6. The latter comprises rails 4 and ties 5 and extends in a longitudinal direction. A central power plant 8 including a drive motor, hydraulic pumps and a generator is provided for delivering the energy required for operation of the machine 1.

Centrally between the two on-track undercarriages 3, there is disposed an electric flash-butt welding unit 9 which is connected to a telescopically extendable and vertically adjustable boom 10 which, in turn, is fastened to the machine frame 2 and rotatable about a vertical axis 11. Arranged underneath the flash-butt welding unit 9 is a rail pulling device 12 which is mounted in guides 13 connected to the machine frame 2. Situated in the region of each one of the two on-track undercarriages 3 are two lifting jacks 14, spaced from one another transversely to the longitudinal direction, which are designed for being placed upon the upper surface of the ties, thus lifting the machine frame 2 off the track 6.

Figure 2:
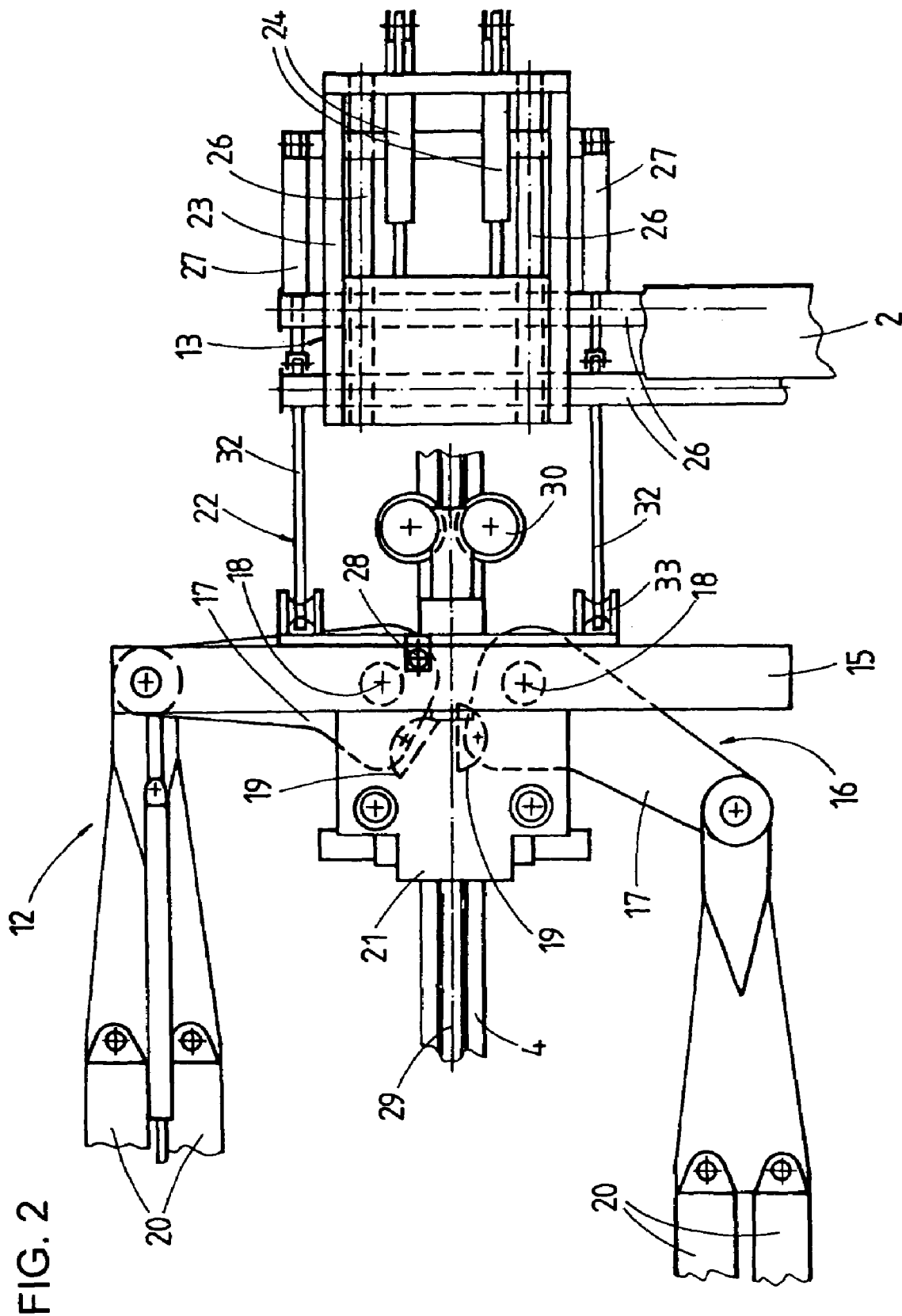
FIGS. 2 and 3 show an enlarged partial top view and side view, respectively, of the rail pulling device.
Figure 3:
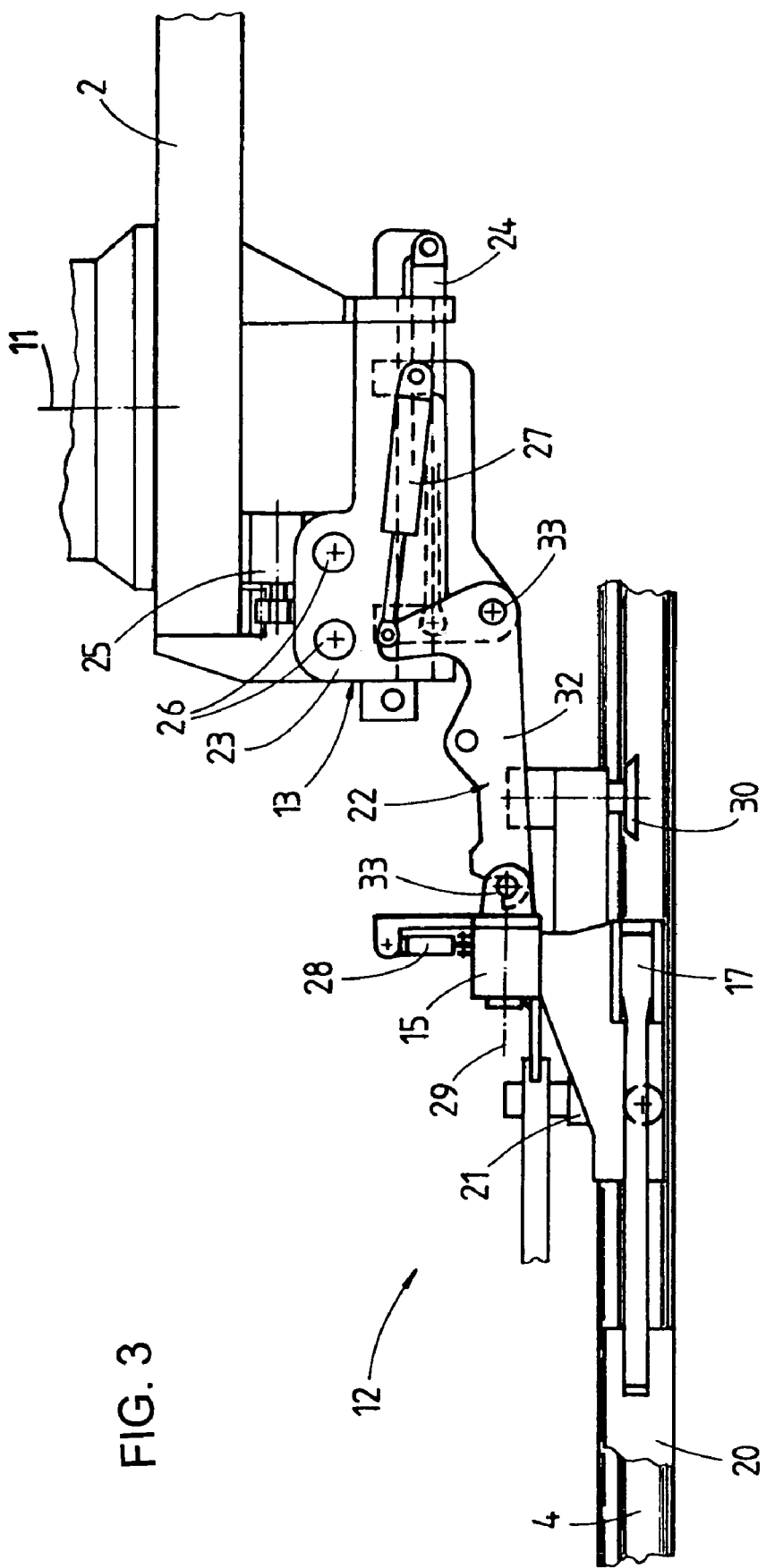

The rail pulling device 12, shown on in FIGS. 2 and 3, for longitudinally shifting or displacing the rails 4 is of substantially symmetrical shape. For the sake of simplicity, only one half of the device is shown. The rail pulling device 12 comprises two transverse beams 15 which are spaced from one another and extend transversely to the longitudinal direction. Arranged on said transverse beams 15 are clamping members 17, forming respective pairs 16, which are connected in each case to the transverse beam 15 for pivoting about a pivot axis 18 extending vertically or perpendicularly to a track plane of the track 6. The two clamping members 17 depicted in the upper part of FIG. 2 of the drawing are shown in the opened position, while the clamping members 17 in the lower part of FIG. 2 are shown in the closed or clamping position. Each clamping member 17, having pivotable clamping jaws 19 for application to a rail web of the rail 4, is articulatedly connected in the end region opposite the pivot axis 18 to two hydraulic drives 20. On the side facing towards one another, the transverse beams 15 are connected in each case to a centering device 21 by means of which the rails 4 can be centered for the welding operation (the centering device 21 is described in more detail in U.S. Pat. No. 5,136,140). In the region of its two transverse beams 15, the rail pulling device 12 is connected in each case to the guide 13 by means of a respective coupling device 22. The coupling device 22 consists of two girders 32, spaced from one another transversely to the longitudinal direction, at the ends of which articulation points 33 are located.

Figure 4:
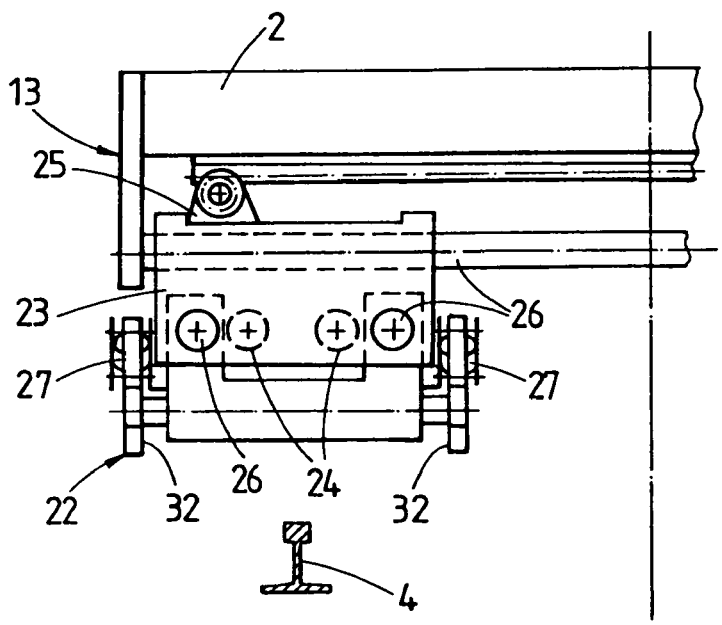
FIG. 4 shows a view, in the longitudinal direction, of a guide of the rail pulling device.

As can be seen also in FIG. 4, each guide 13 comprises a guiding carriage 23 to which the coupling device 22 is articulatedly connected. Said guiding carriage 23 is designed for displacement on guiding rods 26 in the longitudinal direction or transversely to the longitudinal direction by means of longitudinal displacement drives 24 and a transverse displacement drive 25. By means of further drives 27, the coupling device 22 can be pivoted about the articulation points 33. This causes a vertical adjustment of the rail pulling device 12. Also provided on the coupling device 22 is a tilting drive 28 which enables the rail pulling device 12 to pivot about an axis 29 extending in the longitudinal direction.

The working operation of the rail pulling device 12 will now be described briefly. After the welding machine 1 has been driven to the operation site, the rail pulling device 12 with opened clamping members 17 is lowered by means of the drives 27. During this, the longitudinal displacement drives 24 are switched to floating in order to compensate for any displacement of the guiding carriage 23 which might occur. By actuation of the longitudinal and transverse displacement drives 24, 25, the rail pulling device 12 is positioned accurately. Should the rails 4 be in an inclined position in a track curve, this can be compensated for by actuation of the tilting drive 28. In order to facilitate the picking-up of the rails 4, the rail pulling device 12 has additional lifting tongs 30. With the aid of the centering device 21, the rails 4 can be placed in precise alignment with one another. Now the clamping members 17 are closed and, by actuation of the hydraulic drives 20, the rails 4 are pulled towards one another to the distance required for welding, in order to be subsequently welded to one another by means of the welding unit 9.

Figure 5:
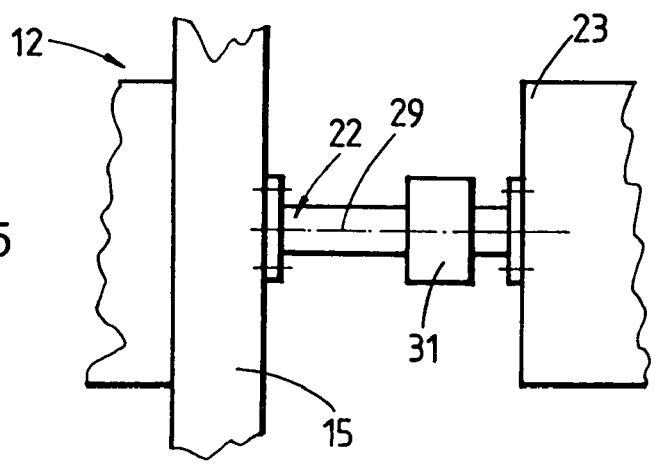
FIG. 5 shows a schematic top view of a further embodiment of the rail pulling device.

A variant, shown schematically in FIG. 5, comprises a vertically, transversely and longitudinally adjustable guiding carriage 23, which is connected to the rail pulling device 12 by means of a rigid coupling device 22. In order to pivot the latter about the axis 29, a rotation drive 31 is integrated into the coupling device 22.

What is claimed as new and desired to be protected by Letters Patent is set forth in the appended claims and their equivalents.

We claim:

1. A machine for welding rails of a track extending in a longitudinal direction, the machine comprising:
    a machine frame extending in the longitudinal direction and having on-track undercarriages for mobility on the track;
    a rail pulling device for gripping the rails to be welded to one another, the rail pulling device having two transverse beams extending substantially perpendicularly to the longitudinal direction;
    clamping members mounted on said transverse beams for pivoting about mutually parallel pivot axes, said clamping members forming two respective pairs, spaced from one another in the longitudinal direction, and having clamping jaws provided for clamping the rail;
    hydraulic drives connecting the two pairs of clamping members to one another;
    a drive connecting said rail pulling device for vertical adjustment to said machine frame;
    coupling devices connecting said rail pulling device to said machine frame in a region of each of said transverse beams, respectively;
    longitudinal displacement drives and transverse displacement drives for displacing each coupling device in the longitudinal direction and transversely to the longitudinal direction relative to said machine frame;
    a tilting drive provided on the coupling device for tilting said rail pulling device about an axis extending in the longitudinal direction; and
    a welding unit for welding the rails.

2. The machine according to claim 1, which further comprises a guiding carriage connected to said coupling device and mounted for displacement transversely to the longitudinal direction relative to said machine frame, with at least one of said longitudinal displacement drives and transverse displacement drives and said drive for vertical adjustment of the rail pulling device being disposed on said guiding carriage.

3. The machine according to claim 1, wherein said coupling device further comprises two girders spaced from one another transversely to the longitudinal direction, with articulation points disposed at the respective ends of said girders.

4. The machine according to claim 1, wherein said tilting drive is a rotation drive.

* * * * *